(12) United States Patent
Knauerhase et al.

(10) Patent No.: US 7,363,355 B2
(45) Date of Patent: Apr. 22, 2008

(54) TRANSPARENT DISCONNECTED SERVICES DISCOVERY AND USE

(75) Inventors: Robert C. Knauerhase, Portland, OR (US); Vijay Tewari, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 952 days.

(21) Appl. No.: 10/611,773

(22) Filed: Jun. 30, 2003

(65) Prior Publication Data

US 2005/0021663 A1     Jan. 27, 2005

(51) Int. Cl.
    *G06F 15/16*    (2006.01)
(52) U.S. Cl. ........................... 709/219; 709/227
(58) Field of Classification Search ........... 709/203, 709/223–225, 217–219, 227–229; 707/3, 707/9, 10
    See application file for complete search history.

(56) References Cited

U.S. PATENT DOCUMENTS

| | | | |
|---|---|---|---|
| 6,757,706 B1* | 6/2004 | Dong et al. .............. | 709/203 |
| 7,035,921 B1* | 4/2006 | Baker ..................... | 709/224 |
| 7,054,618 B1* | 5/2006 | McCullough ............ | 455/414.1 |
| 7,149,892 B2* | 12/2006 | Freed et al. ............. | 713/151 |
| 7,155,425 B2* | 12/2006 | Nykanen ................. | 707/3 |
| 2002/0143819 A1* | 10/2002 | Han et al. ............... | 707/513 |
| 2003/0100307 A1* | 5/2003 | Wolochow et al. ....... | 455/440 |
| 2003/0158915 A1* | 8/2003 | Gebhart .................. | 709/219 |
| 2004/0213409 A1* | 10/2004 | Murto et al. ............ | 380/258 |

* cited by examiner

*Primary Examiner*—William Vaughn
*Assistant Examiner*—Yemane M Gerezgiher
(74) *Attorney, Agent, or Firm*—Schwabe, Williamson & Wyatt, P.C.

(57) ABSTRACT

Web services, such as UDDI based web services, are intended to operate synchronously, e.g., a client issues a discovery request for availability of a service provider, or the client issues a web service request for service by a discovered service provider, and the client is expected to block/wait until a response is received to the clients request. While this configuration may work effectively when the client has a stable network connection, it is not effective when the client is offline. An environment is disclosed for effectively implementing web services when the client is offline by faking appropriate registry and service provider responses, and then deferring request processing until network connectivity is restored.

19 Claims, 6 Drawing Sheets

FIG. 7 ion will
become apparent from the following detailed description of
the present invention in which:

TRANSPARENT DISCONNECTED SERVICES DISCOVERY AND USE

FIELD OF THE INVENTION

The invention generally relates to web services, and more particularly to providing an intermediary facilitating communication between a registry and a client having an intermittent network connection.

BACKGROUND

With the advent of large-scale network connectivity, e.g., interconnection between intranets, the Internet, WANs, LANs, etc. (the term "network" will be used herein to generally reference all network types or combinations thereof), it has become increasingly difficult to locate and track networked devices, and to identify services or capabilities that may be offered by the networked devices. To facilitate dynamic discovery and platform neutral invocation of services, various "web service" related technologies have been implemented.

The phrase "web service" describes a standardized way of describing, discovering, and integrating network applications, services and resources from different businesses using open standards, developed by the World Wide Web Consortium (W3C) and Internet Engineering Task Force (IETF), including XML (Extensible Markup Language), SOAP, WSDL (Web Services Description Language), UPnP (Universal Plug and Play), UDDI (Universal Description Discovery and Integration), etc., over a network, such as the Internet or other networks.

UDDI operates similarly to telephone book yellow and white pages, and is therefore commonly used to implement the service discovery aspect of "web services." UDDI provides a network-based distributed directory enabling entities to list offered services, and conversely UDDI provides a mechanism for clients to dynamically find services being offered by other entities. To do so, UDDI uses a global set of registries (also referred to as directories or databases) to allow businesses to register their services, share information about how the business interacts with other businesses or entities, and to permit searching for other businesses, web services, or services or resources presently available on a network. For more information, see the UDDI Technical Specification located at URL (Internet Uniform Resource Locator) http://uddi#org/pubs/uddi-v3.00-published-20020719#htm (to prevent inadvertent hyperlinks, periods in URLs herein have been replaced with hash marks). As of this writing, the current UDDI specification is Version 3.0, published 19 Jul. 2002.

UDDI communicates using open standards, including XML, SOAP, HTTP (HyperText Transfer Protocol), etc. And, while UDDI's global nature provides a centralized source for locating offered services, the client is required to be in network communication with the UDDI registry in order for it to discover services. That is, a client is expected to be on a network over which a UDDI response may be received. This arrangement is impractical for mobile clients, such as a mobile computer, which may be temporarily unable to communicate with the UDDI registry (or registries) for lack a communication link over a viable network.

BRIEF DESCRIPTION OF THE DRAWINGS

The features and advantages of the present invention will become apparent from the following detailed description of the present invention in which.

DETAILED DESCRIPTION

While the following description presumes, for expository convenience, on use of the well-known UDDI environment, it will be appreciated that the principles disclosed herein are applicable to other environments which may be developed in the future. Illustrated embodiments of the invention concern providing an ability to intercept web-service discovery requests (e.g. UDDI or similar queries), and process these requests, where processing includes determining whether a registry is available to respond to the query, and if not, e.g., when network connectivity is not available, maintaining state for each request, and buffering the queries to wait until the registry is available.

Figure 1:
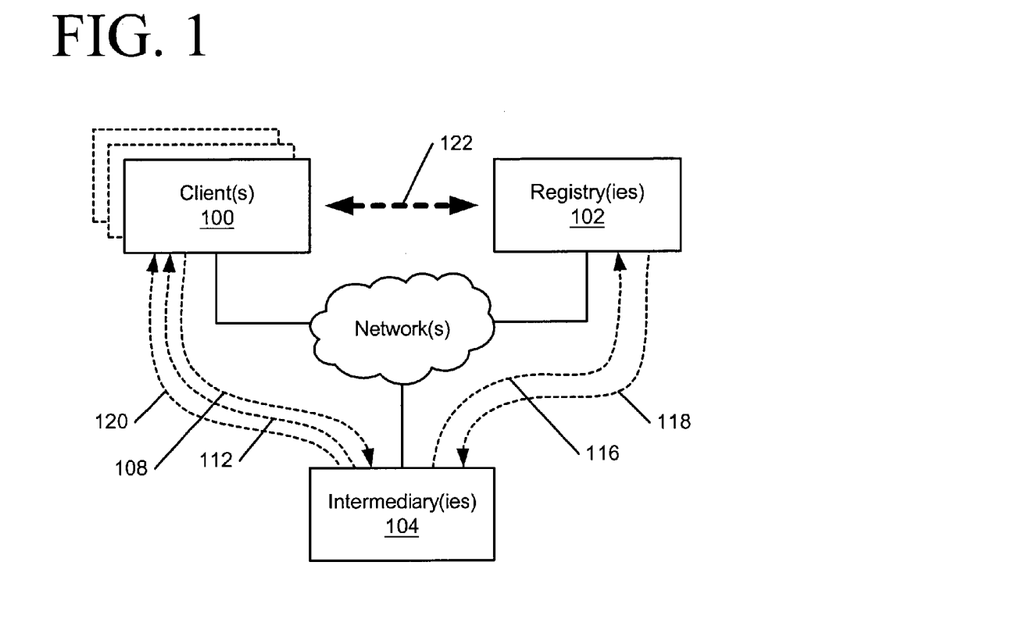
FIGS. 1 and 2 give a dataflow overview according to one embodiment.
Figure 2:
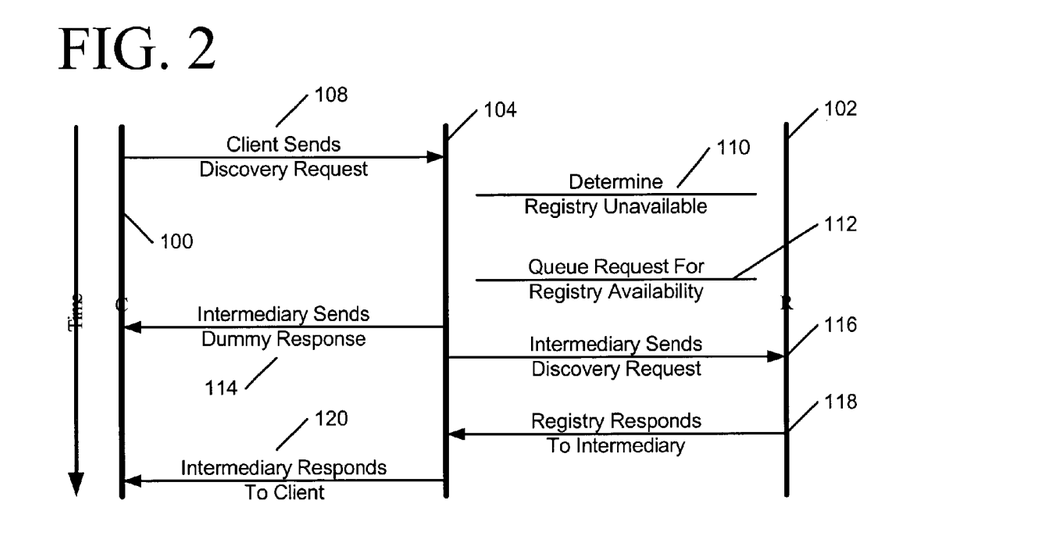

FIGS. 1 and 2 give a dataflow overview according to one embodiment. FIG. 1 illustrates an exemplary dataflow in a system including one or more of a client 100, a registry 102, and an intermediary 104. FIG. 2 illustrates a corresponding timeline of operations. Similarly numbered items in both figures correspond to the same action/occurrence; discussion will follow both figures.

The client 100 seeks a service, and therefore issues 108 a UDDI service discovery request for the desired service. It is assumed herein the intermediary 104 and client are configured so that the intermediary may, if desired, monitor, intercept, and respond to client discovery requests (see, e.g., FIG. 5 for one exemplary embodiment). It can be appreciated that the intermediary component 104 may exist on the client itself or could be located on a device which is currently accessible from the client. The intermediary may determine 110 that the registry is unavailable. For example, the client may be utilizing a wireless network connection and may have temporarily moved out of range of an access point, resulting in loss of a, network connection and hence the unavailability of a registry to service the request.

In a conventional UDDI environment, lack of a registry would result in failure of the client's issued 108 discovery request. In the illustrated embodiments, however, the intermediary may intercept and queue 112 the request intended for the registry 102, and then operate as a "pseudo registry" and respond 114 to the UDDI discovery request with a dummy acknowledgement identifying a "pseudo service provider" that will work on the request. It will be appreciated that the "pseudo registry" and "pseudo service provider" are not, in fact, operable registries or service providers. Instead, in one embodiment, when the registry 102 is not available, the intermediary is configured to always respond to discovery requests with an affirmative response that the pseudo service provider is available to perform the requested service. Various message-queuing systems or other mechanisms may be employed to implement the queuing 112. In one embodiment, see, e.g., FIG. 5, the "pseudo registry" and "pseudo service provider" are integral components of the client that operate in conjunction with the client web services software.

The intermediary 104 may then monitor or otherwise wait for the registry 102 to become available, and when available, the intermediary may transparently operate as a middleman facilitating communication between the client 100 and registry by translating requests from client software of the client to appear to originate from the intermediary pseudo registry, and conversely translating responses from the registry to appear to originate from the pseudo registry. In such fashion, the client and registry may communicate, even if the client only has an intermittent network connection with the registry. Thus, when the registry becomes available, the intermediary sends 116 the client's discovery request to the registry.

Note that UDDI service requests/registry responses are typically point-to-point. Consequently, before sending 116 the client's discovery request, the intermediary 104 translates or otherwise alters the request so that it appears to originate from the intermediary. The registry 102, after receiving and processing the modified discovery request, issues 118 a response to the intermediary, which in turn is used in a response from the intermediary pseudo registry to the requesting client. Again, since the communication is point-to-point, the intermediary translates or otherwise alters the response from the registry so that it appears to have originated from the intermediary pseudo registry.

For simplicity, current implementations of UDDI have been designed so that UDDI registry operations are synchronous, meaning a requesting client blocks and waits until it receives a response from a registry. Since a requesting client may be offline and may have a lengthy delay before its request is actually processed by a registry, in some embodiments, the intermediary 104 and client 100 employ asynchronous communication in at least performing UDDI service discovery. Asynchronous operation affords the client certain benefits, including, for example, ability to issue 108 a discovery request and then go on to processing other tasks until a call back response is received from the pseudo registry. The intermediary, however, may be assumed to have a steady network connection and therefore use traditional synchronous communication with the registry. Except for FIG. 5, which references an asynchronous component, the illustrated embodiments contemplate either synchronous or asynchronous communication.

Figure 3:
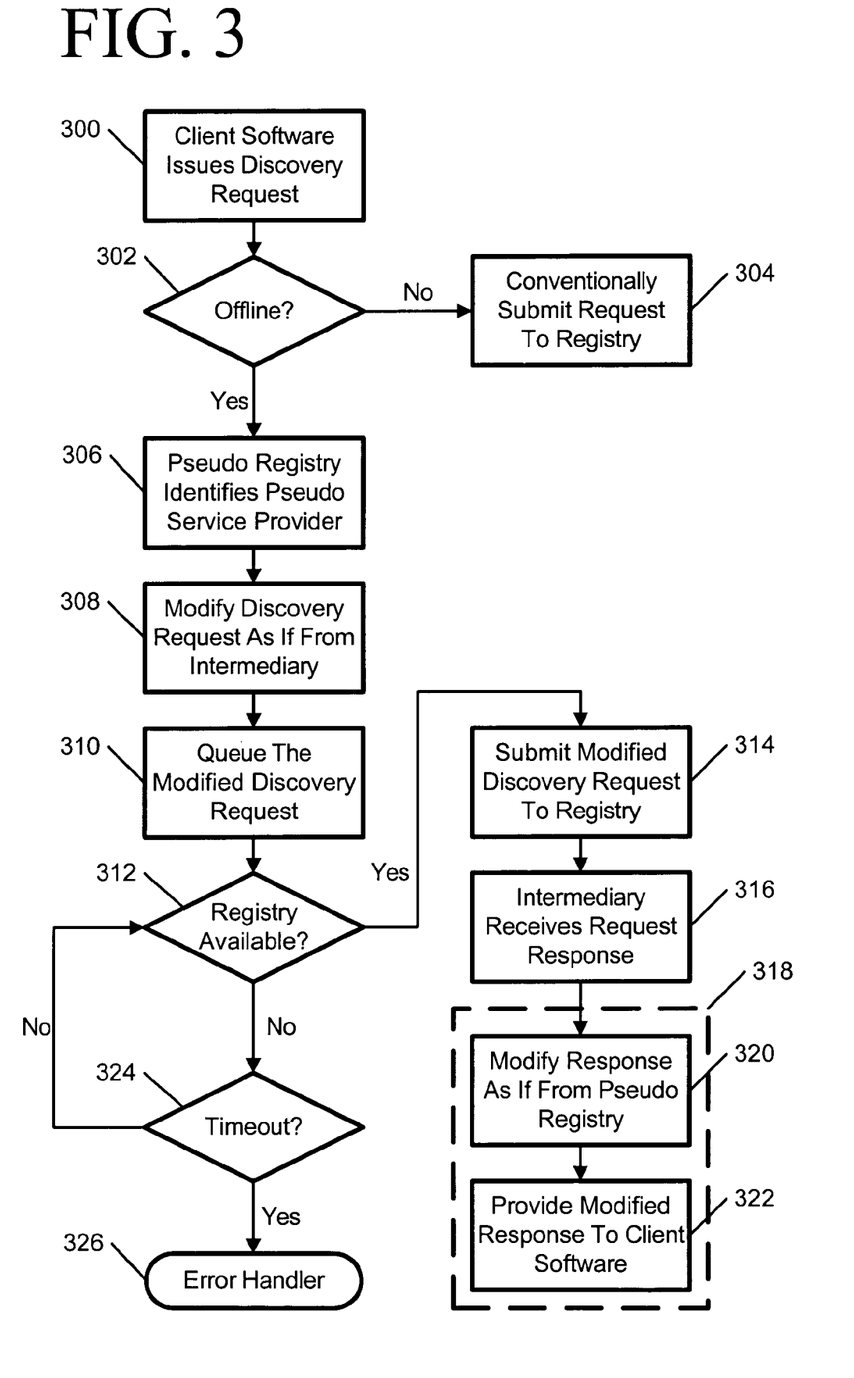
FIG. 3 illustrates a flow-chart according to one embodiment for operation of web services software of a client.

FIG. 3 illustrates a flow-chart according to one embodiment for operation of web services software of a client 100 which includes code for implementing the intermediary 104 "pseudo registry" and "pseudo service provider."

As illustrated, client software, such as web services software based on the Microsoft® Corporation .NET (dot net) framework, issues a discovery request for some desired service. The details of UDDI service discovery are not discussed herein and familiarity therewith is assumed. A test 302 is performed to determine whether the client is currently offline or unable to communicate with the service registry. It will be appreciated there are various well-known techniques for identifying offline status, and there may be various reasons for being offline, including physical separation from a wired network, network services having been suspended, network hardware being disabled, perhaps, for example, wireless hardware being disabled due to low battery availability, going out of range of a wireless access point, etc. If the client is not offline, then the discovery request may be handled conventionally, e.g., forwarded off to a registry for handling. Note that references herein to a "client" being "offline" are intended to generally reference the above and other physical and/or software reasons for the client and/or the client software being unable to communicate with registries and/or service providers.

Although the details of locating the registry is not discussed herein, as it is dependent on the protocol used, e.g., UDDI or other protocol, it will be appreciated that their may be one or more registries that are queried to satisfy the discovery request, and that one registry may forward a request to another registry. For example, there may be a local registry for a local network that tracks services offered by devices of the local network, where the local registry first tries to resolve requests with locally offered services, and if that fails, the local registry may forward the request to a remote global registry. As used herein, the term "registry," except when referencing a pseudo registry, is intended to refer to one or more local and/or remote or global registries.

If the test 302 indicates the client is offline, then in one embodiment, a "pseudo registry" component of a FIG. 1 intermediary 104 responds to the discovery request and identifies 306 a "pseudo service provider" that is able to respond to the request. As discussed above, neither the pseudo registry nor pseudo service provider need be actual registries or providers (although they could, in other embodiments, provide some of their functionality). Instead, when the client is offline, the pseudo registry, in one embodiment, is configured to respond to all discovery requests affirmatively indicating the pseudo service provider is available.

In another embodiment, the pseudo registry does not affirmatively respond to certain types of discovery requests. For example, it may be disadvantageous to respond affirmatively to a discovery request for a time bound service, e.g., where there is a known performance expiration, or if the query includes a Quality of Service (QoS) requirement, or if the client is seeking a real time service or some other service in which the delay inherent to being offline may cause a problem for the requesting software.

After responding 306 to the discovery request, in one embodiment, the intermediary modifies 308 the discovery request so that it appears to originate from the intermediary. This is necessary because it allows the intermediary to await availability of the registry, and results in a response from the registry being received by the intermediary instead of by the client. The client would be confused if it received the response as it would be originating from a registry different from the pseudo registry that initially responded and identified the pseudo service provider. The modified request is then queued 310 until a test 312 indicates registry availability.

When the registry becomes available, the intermediary submits 314 the modified discovery request to the registry, in response to which the intermediary receives 316 a response to the modified request. As in a conventional UDDI discovery context, the registry may provide the intermediary with various responses to the discover request, including a response identifying a (real) service provider for the client's requested service, unavailability of a provider for the service, etc.

Since the pseudo registry has already told the requesting client that the pseudo service provider may handle the request, generally the pseudo registry does not have to forward on the response received from the registry to the requesting client. However, there may be circumstances where forwarding the response may be necessary, such as if the client and registry are aware of the intermediary and desire to increase efficiency, reduce latency, improve QoS, etc. by negotiating to remove the intermediary from the client-registry (and/or client-service provider) communication path Thus, box 318 illustrated with dashes contains placeholder operations for forwarding the response from the registry to the client. As illustrated, since the client is expecting responses from the pseudo registry, the response from the registry is modified 320 so that it appears to originate from the pseudo registry that responded to the discovery request 300. If necessary or otherwise desired, the response from the registry is also modified to ensure that references in the response to an actual service provider are replaced with corresponding references to the pseudo service provider identified by the pseudo registry. It will be appreciated that a mapping feature, table, or other data construct may be used to track correspondences between one or more reported pseudo providers and the actual service provider to provide service. In one embodiment, each client discovery request results in different pseudo provider being identified to the client. The modified response is provided 322 to the requesting client software.

If the test 312 did not indicate registry availability, in one embodiment, to prevent the client from issuing too many requests while offline, a test 324 is performed to determine whether a timeout condition has occurred, e.g., have we been offline too long. If not, then processing may loop to checking registry availability or other action (not illustrated) taken. If a timeout occurs, an error handler may be invoked 326. For example, in one embodiment, the error handler may issue service unavailability errors for each (if necessary) of the queued 310 requests. In one embodiment, the client software is aware of the intermediary, and the error handler informs the client software of the error condition, e.g., the timeout.

Figure 4:
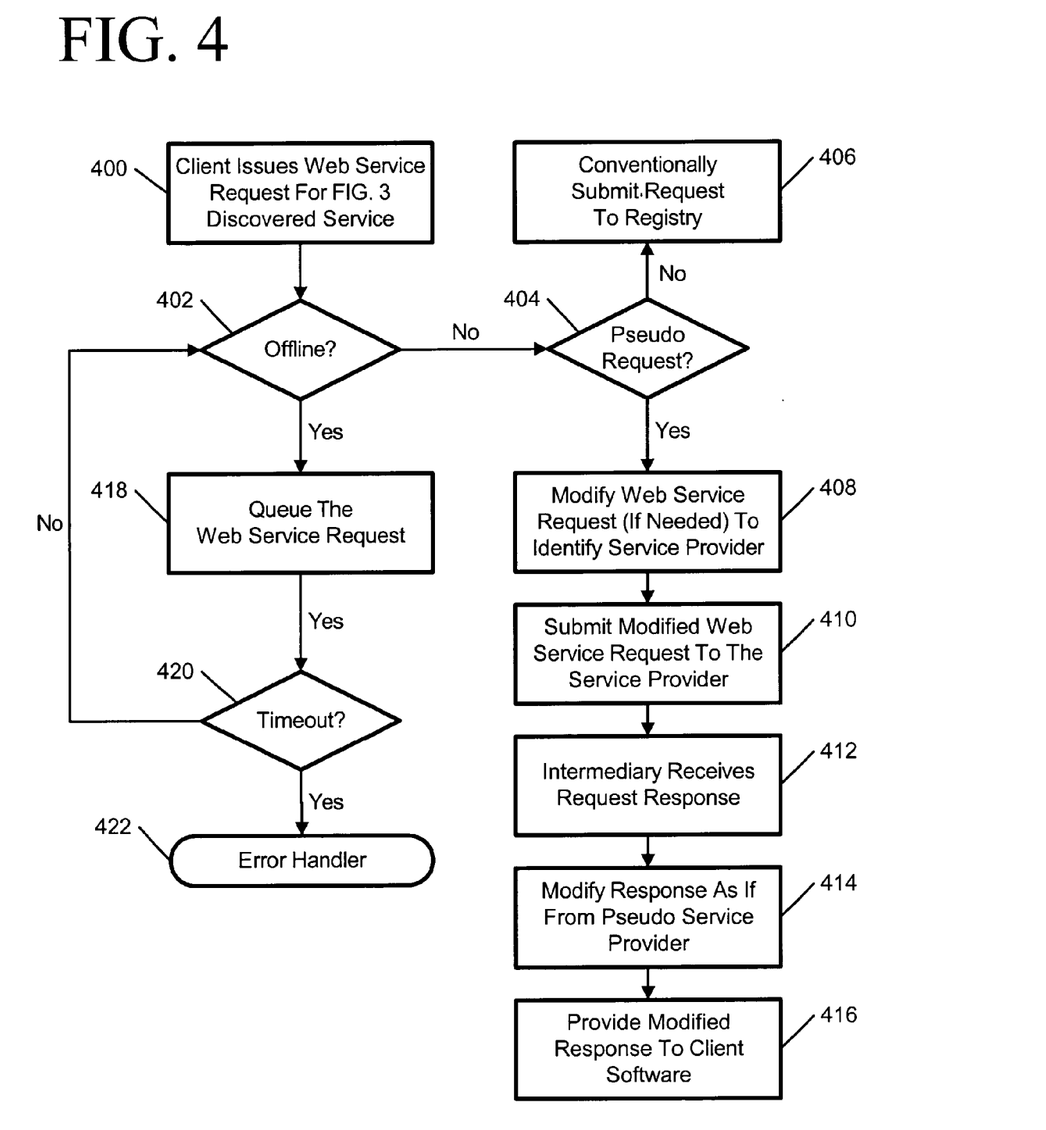
FIG. 4 illustrates a flow-chart according to one embodiment for the client issuing a web service request.

FIG. 4 illustrates a flow-chart according to one embodiment for the client issuing 400 a web service request for service by the FIG. 3 "pseudo service provider" identified by the "pseudo registry." Recall that in FIG. 3 the client software may have conventionally 304 processed the discovery request, resulting in identification of a service provider being cached by the client, or it may have received an offline response from a pseudo registry identifying a pseudo service provider. Note the issued 400 request may be a de-queued past request, or a current (e.g., "live") request issued by the client software. The details of de-queuing a past request are not illustrated.

When the client software issues 400 a web service call, a test 402 is performed to determine whether the client software is offline, e.g., it may still be offline from FIG. 3 item 302. If not offline, e.g., a network connection is available, a further test 404 is performed to determine whether the request is a "pseudo request," e.g., one calling for the pseudo service provider. Recall that in FIG. 3, if not offline in item 302, a discovery request was submitted conventionally to identify a service provider, this provider identity would have been cached and therefore subsequent web service calls would not reference a pseudo service provider. Hence, if not a pseudo request, then the request is conventionally submitted 406 to the service provider.

Since the client software has been misled to believe services are available while offline, it may have been issuing many requests to the pseudo registry provider and/or the pseudo service provider while the client was offline. Consequently, when network connectivity is restored, if the test 404 indicates a pseudo request, the pseudo request is modified 408 (if needed) to reference the service provider identified in FIG. 3, e.g., received response 316. This modified web service request is then submitted 410 to the service provider for handling the request. Note that if the initial discovery request 300 occurred when the client was offline, the submitted 314 discovery request was modified to appear to originate from the intermediary, and hence modifying the web service request includes modifying it to appear to originate from the intermediary.

Consequently, assuming the web service request has been modified to identify the intermediary as the origin of the request, the service provider's response is received 412 by the intermediary. The intermediary modifies 414 the received service provider response so that it appears to originate from the pseudo service provider as is expected by the client by the client software. The modified response is provided 416 to the client software.

If the test 402 indicates the client is offline, then assuming the client remains offline since the FIG. 3 test 302 for offline status, the client software has already cached the pseudo service provider as the provider for responding to the web service request 400, and hence the received web service request may simply be queued 418 to await availability of the network. Note that if we remove the assumption that the client remains offline between FIG. 3 offline test 302 and FIG. 4 offline test 402, and instead assume the client obtained network connectivity after issuing 300 an offline discovery request, the intermediary may re-issue the discovery request to identify a service provider to handle the received 400 web service request. Conversely, if the client had network connectivity in FIG. 3, and went offline before issuing 400 the web service request, the queued web service request would identify a non pseudo service provider and hence would be submitted 406 as discussed above for conventional processing.

Since we might not want the client to issue too many requests while offline, in one embodiment, a test 420 is performed to determine whether a timeout condition has occurred, e.g., have we been offline too long. If not, then processing may loop or other action (not illustrated) taken. If a timeout occurs, an error handler may be invoked 422. For example, in one embodiment, the error handler may issue service unavailability errors for each (if necessary) of the queued 418 requests. In one embodiment, the client software is aware of the intermediary, and the error handler informs the client software of the error condition, e.g., the timeout.

In such fashion, client software may both issue web service calls that are directly processed by a registry and service provider, or indirectly processed by way of an intermediary pseudo registry and pseudo service provider that queues service discovery requests and web service calls, as needed, for later processing by a registry and service provider when network connectivity is restored. Such delayed handling of discovery requests and web service requests allows mobile clients, for example, to operate effectively in Web Service-oriented environments even though the mobile client may be relegated to intermittent network connectivity.

Figure 5:
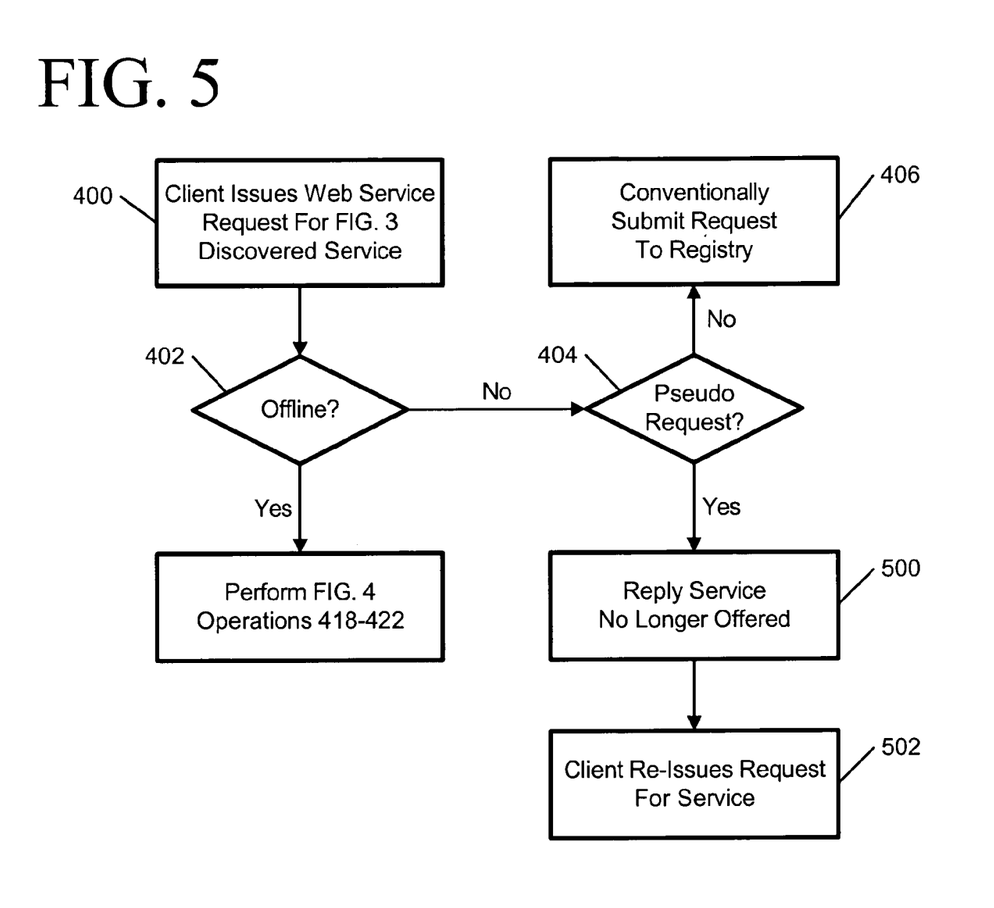
FIG. 5 illustrates a variation according to one embodiment of the FIG. 4 embodiment.

FIG. 5 illustrates a variation according to one embodiment of the FIG. 4 embodiment. In this embodiment, as illustrated in FIG. 4, the client software issues 400 a web service request, and tests 402, 404 are performed to determine whether the client is offline, and whether the received web service request is a pseudo request.

As discussed above with respect to FIG. 4, if the client is offline, then FIG. 4, operations 418-422 are performed as discussed above to queue the web service request for later processing. If the test 404 indicates the request is not a pseudo request, then the request is submitted 406 for conventional handling.

However, in this embodiment, if the tests 402, 404 indicate the client has network connectivity and has issued a pseudo request, e.g., the request is for the pseudo service provider identified by the pseudo registry while the client was offline, then the intermediary replies 500 with a UDDI error response to indicate the pseudo service provider no longer offers the desired service.

In response to this, as suggested by the UDDI Technical Specification §5.1.3 ("The Invocation Pattern"), when the client software's request for service fails using the cached information received from the pseudo registry, it is assumed the client software re-issues 502 its discovery request 300 for service, as well as any queued 418 web service requests that may also have failed. If the client does not re-issue its request, it may be processed by way of the intermediary as discussed above.

Figure 6:
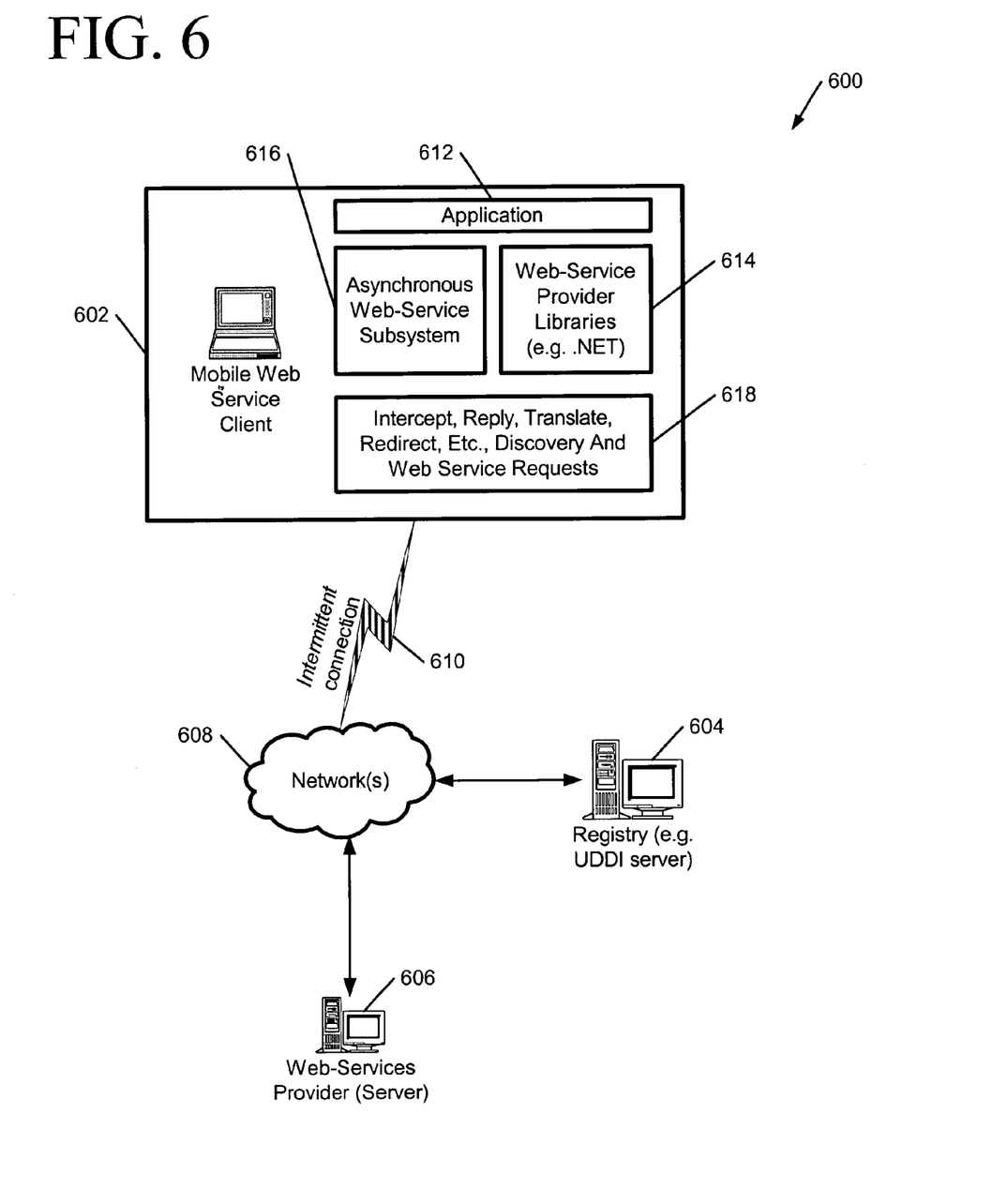
FIG. 6 illustrates an exemplary system that may be used to implement aspects of the FIGS. 1-5 embodiments.

FIG. 6 illustrates an exemplary system 600 comprising a client 602, a registry 604, and a web services provider 606 communicatively coupled by way of a network 608 that may be used to implement aspects of the FIGS. 1-5 embodiments discussed above. The illustrated client 602 has an intermittent network connection 610, which as discussed above, may be intermittent for various reasons.

As illustrated the client 602 has several components, including an application program 612, e.g., client software, responsible for issuing UDDI discovery requests and web service requests for service. The application program operates on top of, e.g., makes use of web service provider libraries 614, such as the Microsoft® .NET framework, and these libraries are used to implement an asynchronous web-service subsystem 616. As discussed above, UDDI is intended to operate synchronously with the client 602, but in illustrated embodiments, operations may be performed asynchronously so that the client may perform other tasks without blocking or waiting for UDDI requests to complete while the client is offline. The relationship between the illustrated components 612-618 of the client, and the asynchronous communication of the illustrated web-services subsystem, will be appreciated by one skilled in the art.

In the illustrated embodiment, the web-service subsystem and API are in turn built on top of an Intermediary Module 618 which operates to monitor, intercept, reply, translate, redirect, etc., discovery (e.g., FIG. 3 item 300) and web service requests (e.g., FIG. 4 item 400). As discussed above, the Intermediary Module simulates a pseudo registry and pseudo service provider responsive to requests received from the application program while the client is offline, and appropriately queues, translates, etc. the requests for processing by the registry 604 and web services provider 606 when the client once again has connectivity to the network 608.

Figure 7:
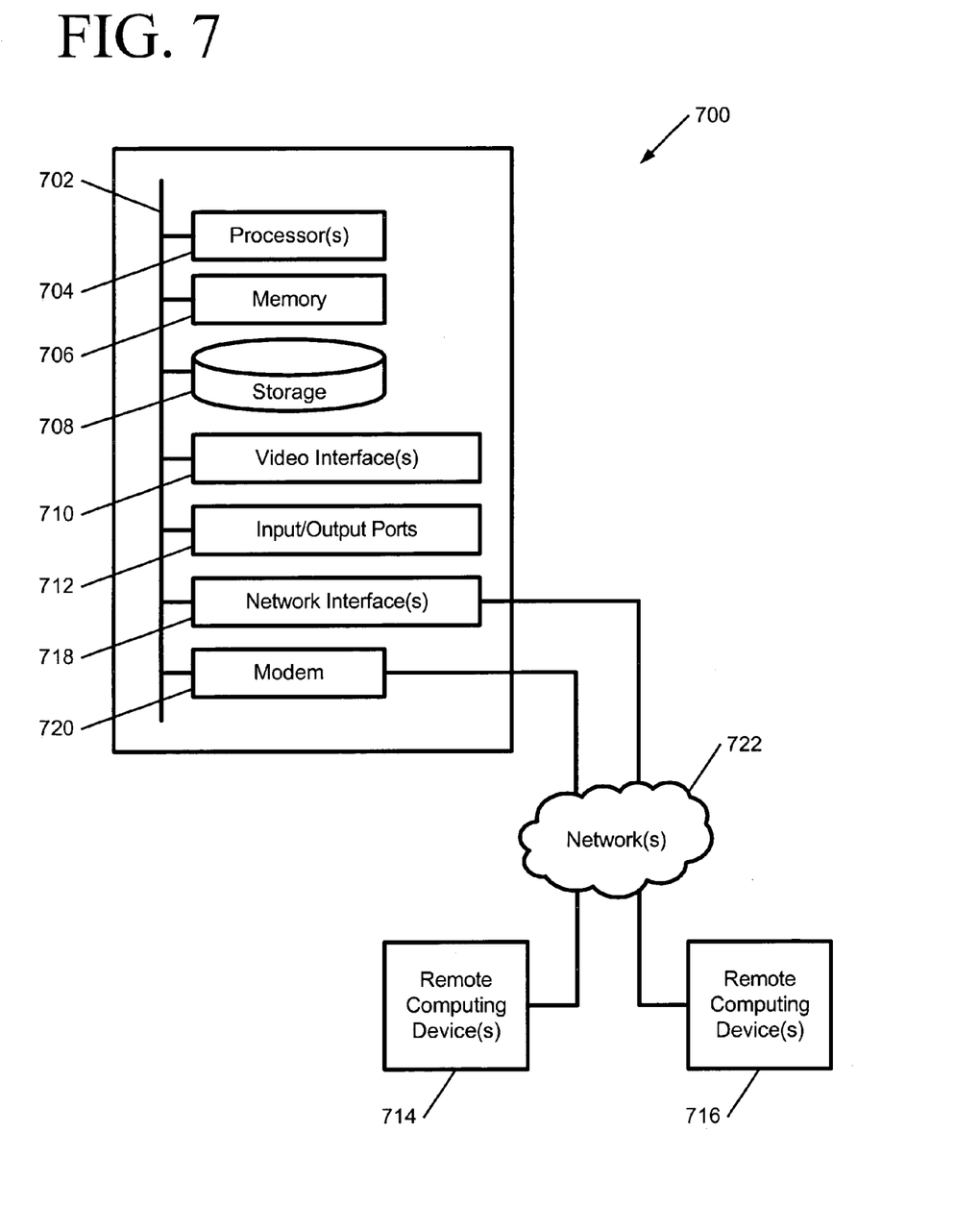
FIG. 7 illustrates a suitable computing environment in which certain aspects of the invention may be implemented.

FIG. 7 and the following discussion are intended to provide a brief, general description of a suitable environment in which certain aspects of the illustrated invention may be implemented. The environment includes a machine 700. As used herein, the term "machine" is intended to broadly encompass a single machine, or a system of communicatively coupled machines or devices operating together. Exemplary machines include computing devices such as personal computers, workstations, servers, portable computers, handheld devices, e.g., Personal Digital Assistant (PDA), telephone, tablets, etc., as well as transportation devices, such as private or public transportation, e.g., automobiles, trains, cabs, etc.

Typically, the machine 700 that includes a system bus 702 to which is attached processors 704, a memory 706, e.g., some combination of volatile and/or non-volatile state preserving medium, storage devices 708, a video interface 710, and input/output interface ports 712. The machine may be controlled, at least in part, by input from conventional input devices, such as keyboards, mice, etc., as well as by directives received from another machine, interaction with a virtual reality (VR) environment, biometric feedback, or other input source or signal.

The machine may utilize one or more connections to one or more remote machines 714, 716, such as through a network interface 718, modem 720, or other communicative coupling. Machines may be interconnected by way of a physical and/or logical network 722, such as the network 608 of FIG. 6, an intranet, the Internet, local area networks, and wide area networks. Thus, for example, with respect to the illustrated embodiments, assuming machine 700 embodies the client 100 of FIG. 1, then remote machines 714, 716 may respectively be the FIG. 1 registry 102 and the FIG. 6 web service provider.

One skilled in the art will appreciated that communication with network 722 may utilize various wired and/or wireless short range or long range carriers and protocols, including radio frequency (RF), satellite, microwave, IEEE (Institute of Electrical and Electronics Engineers) 802.11, Bluetooth, optical, infrared, cable, laser, etc. The machine may include embedded controllers, such as programmable or non-programmable logic devices or arrays, Application Specific Integrated Circuits, embedded computers, smart cards, and the like. And, it will be appreciated that remote machines 714, 716 may be configured like machine 700, and therefore include many or all of the elements discussed for machine.

The invention, or portions thereof, may be described by reference to or in conjunction with associated data including functions, procedures, data structures, application programs, etc. which when accessed by a machine results in the machine performing tasks or defining abstract data types or low-level hardware contexts. Associated data may be stored in, for example, volatile and/or non-volatile memory 706, or in storage devices 708 and their associated storage media, including hard-drives, floppy-disks, optical storage, tapes, flash memory, memory sticks, digital video disks, biological storage, etc. Associated data may be delivered over transmission environments, including network 722, in the form of packets, serial data, parallel data, propagated signals, etc., and may be used in a compressed or encrypted format. Associated data may be used in a distributed environment, and stored locally and/or remotely for access by single or multi-processor machines.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for an intermediary device to provide responses to discovery requests for services when a registry of services is unavailable, comprising:
   receiving, by the intermediary device, from a client a discovery request for a service;
   determining, by the intermediary device, whether the registry is unavailable, the determining including determining an online client state or offline client state of the client indicative of whether the client is communicatively coupled with the registry;
   altering, by the intermediary device, the discovery request into a modified request appearing to originate from the intermediary; and
   if the registry is determined to be unavailable, queuing, by the intermediary device, the modified discovery request for delivery to the registry when it becomes available, and providing, by the intermediary device, to the client a dummy response to the request indicating the service is available, the dummy response indicating that a pseudo service is available to perform the requested service to enable the client to issue service requests of the pseudo service provider.

2. The method of claim 1, wherein the method further comprises:
   forwarding, by the intermediary device, the modified request to the registry when the registry is determined to be available;
   receiving, by the intermediary device, in response, a reply from the registry for the forwarded discovery request;
   altering, by the intermediary device, the received reply into a modified reply appearing to originate from the intermediary; and
   sending, by the intermediary device, the modified reply to the client.

3. The method of claim 2, wherein the reply from the registry includes an identification of a service provider available to perform the requested service.

4. The method of claim 3, further comprising:
   receiving, by the intermediary device, at least one service request from the client for utilizing the service;
   altering, by the intermediary device, the service request into a modified service request appearing to originate from the intermediary; and
   forwarding, by the intermediary device, the modified service request to the service provider available to perform the requested service.

5. The method of claim 4, further comprising:
   starting, by the intermediary device, a timer measuring unavailability of the service provider;
   determining, by the intermediary device, the timer exceeds a threshold, and responsive thereto, replying to the client discovery request with an error.

6. The method of claim 1, wherein the pseudo service is the intermediary device.

7. The method of claim 1, wherein the discovery request comprises a UDDI discovery request.

8. The method of claim 1, further comprising:
   receiving, by the intermediary device, at least one successive request from the client for the service;
   if in the online client state, replying, by the intermediary device, to the client that the service is no longer provided.

9. The method of claim 8, wherein the client is configured to perform another discovery request for the service responsive to the reply if the service is no longer provided.

10. The method of claim 1, further comprising:
    receiving, by the intermediary device, at least one successive request from the client identifying the service; and
    replying, by the intermediary device, to the client that the service is no longer provided, wherein the client is configured to repeat its discovery request for the service responsive to the reply the service is no longer provided.

11. The method of claim 1, further comprising:
    receiving, by the intermediary device, a second service request from the client for the service;
    repeating, by the intermediary device, said determining whether the registry is unavailable;
    if available, replying, by the intermediary device, to the client that the service is no longer provided; and
    if unavailable, altering, by the intermediary device, the second service request into a second modified request appearing to originate from the intermediary, and queuing the second modified request for delivery to the service registry when it becomes available.

12. The method of claim 1, wherein at least the client and intermediary utilize an asynchronous communication protocol.

13. The method of claim 12, wherein the client performs an other task while waiting for a response to an asynchronous discovery request.

14. The method of claim 1, further comprising:
    if the registry is determined to be unavailable, starting, by the intermediary device, a timer measuring unavailability of the registry; and
    determining, by the intermediary device, whether the timer exceeds a threshold, and responsive thereto, replying to the client discovery request with an error.

15. The method of claim 14, wherein the error comprises an indicator that the timer exceeded the threshold.

16. The method of claim 14, wherein the error comprises an indicator that no service provider is available to perform the requested service.

17. An article of manufacture comprising:
    a storage medium; and
    a plurality of programming instructions stored on the storage medium, the programming instructions configured to program an intermediary device to
        receive from a client a discovery request for a service,
        determine whether the registry is unavailable, the determining including determining an online client state or offline client state of the client indicative of whether the client is communicatively coupled with the registry,
        alter the discovery request into a modified request appearing to originate from the intermediary,
        if the registry is determined to be unavailable, queue the modified discovery request for delivery to the registry when it becomes available, and provide to the client a dummy response to the request indicating the service is available, the dummy response indicating that a pseudo service provider is available to perform the requested service to enable the client to issue service requests of the pseudo service provider.

18. The article of claim 17 wherein the programming instruction are further configured to:
    forward the modified request to the registry when the registry is determined to be available;

receive, in response, a reply from the registry for the forwarded discovery request;

alter the received reply into a modified reply appearing to originate from the intermediary; and send the modified reply to the client.

19. The article of claim 18 wherein the reply from the registry includes an identification of a service provider available to perform the requested service, and the programming instruction are further configured to:

receive at least one service request from the client for utilizing the service;

alter the service request into a modified service request appearing to originate from the intermediary; and forward the modified service request to the service provider available to perform the requested service.

* * * * *